United States Patent
Barker et al.

(10) Patent No.: US 6,470,020 B1
(45) Date of Patent: Oct. 22, 2002

(54) INTEGRATION OF STIMULUS SIGNALLING PROTOCOL COMMUNICATION SYSTEMS AND MESSAGE PROTOCOL COMMUNICATION SYSTEMS

(75) Inventors: Iain William Barker; David John Tubb, both of Maidenhead; Peter Karel Jarvis, Richmond, all of (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/185,361

(22) Filed: Nov. 3, 1998

(51) Int. Cl.[7] .............................. H04L 12/28; H04J 3/12
(52) U.S. Cl. ...................... 370/401; 370/410; 370/522; 370/352
(58) Field of Search ................................. 370/260–261, 370/352, 385, 410, 401, 431, 433, 437–439, 522, 524; 709/204, 227, 230; 379/93.01, 202.01, 205.01, 207.02, 229

(56) References Cited

U.S. PATENT DOCUMENTS 5,574,861 A * 11/1996 Lorvig et al. ............... 370/522
5,909,431 A * 6/1999 Kuthyar et al. ............. 370/260
5,995,595 A * 11/1999 Hickey et al. .............. 370/524
6,018,360 A * 1/2000 Stewart et al. ........... 348/14.09
6,188,676 B1 * 2/2001 Pirich ......................... 370/261

* cited by examiner

*Primary Examiner*—Chau Nguyen
*Assistant Examiner*—Andy Lee
(74) *Attorney, Agent, or Firm*—Lee, Mann, Smith, McWilliams, Sweeney & Ohlson (57) ABSTRACT

Stimulus signalling protocols and message protocols are methods for transferring information over a communications network. Stimulus signalling protocols (e.g. P-Phone) are typically used for connecting simple terminals to a more powerful host whereas message protocols (e.g. H.323 standard) are typically used to connect between such hosts. Equipment has typically been developed and manufactured for use with either but not both systems and this has led to the need for protocol conversion devices which are complex and time consuming to develop and maintain. Voice data is sent via an H.323 channel over a data network and associated P-Phone signalling data is sent via a T.120 channel as part of the H.323 call. This enables stimulus signalling protocol equipment (e.g. business telephony handsets) to be used in message protocol systems without the need for protocol conversion.

22 Claims, 7 Drawing Sheets

INTEGRATION OF STIMULUS SIGNALLING PROTOCOL COMMUNICATION SYSTEMS AND MESSAGE PROTOCOL COMMUNICATION SYSTEMS

BACKGROUND OF THE INVENTION

1. Field of the Invention

This invention relates to the integration of stimulus signalling protocol communication systems with message protocol communication systems.

2. Description of the prior art

Stimulus signalling protocols and message protocols are two methods for transferring information over a communications network. Stimulus signalling is typically used for connecting simple (dumb) terminals to a more powerful host. Message protocols are typically used to connect between such hosts. Equipment has typically been developed and manufactured for use with either stimulus signalling protocol systems or message protocol systems but not both. Both types of protocol have different advantages and disadvantages and previously, in order to exploit the advantages of both protocols, users have needed to install equipment for each type of protocol or employ the use of a protocol conversion device. Such protocol conversions are complex and time consuming to develop and maintain.

Figure 1:
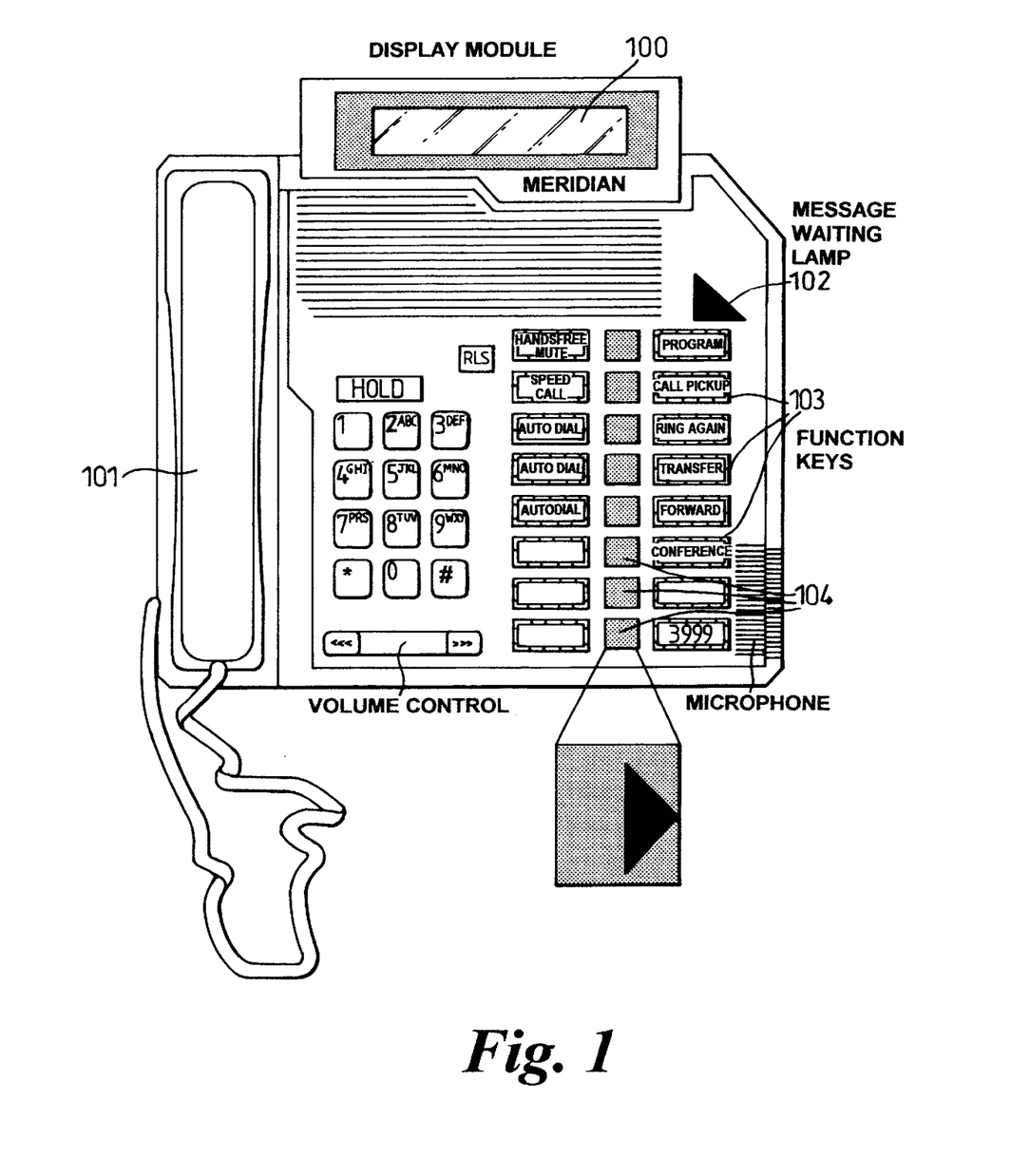
FIG. 1 is a general schematic diagram of a business handset.

An example of a stimulus signalling protocol is P-Phone which is a proprietary protocol developed by Northern Telecom Limited. P-Phone is typically used in telecommunications networks and equipment has been developed for use in this type of system. P-Phone is used for Northern Telecom's DMS support of Centrex services. Simple terminals, for example, "business handsets" have been developed for use in this type of system. The term "business handset" is used herein to refer to any type of terminal in a communications network which has a number of input devices such as keys and buttons. A business handset usually also has display capabilities but this is not essential. FIG. 1 shows an example of a business handset which has a display panel 100, telephone hand piece 101, a message waiting lamp 102, a number of function keys 103, and a number of indication lamps 104.

When a user makes an action using the business handset shown in FIG. 1, for example by pressing a button on the handset, a signal is sent from the terminal to a node in the communications network to which the terminal is connected. Whenever an individual keypress is made an individual transaction occurs between the terminal and a node to which it is connected. For example, when a telephone number is entered in order to make a telephone call to a third party (called party) the digits are sent one at a time in separate transactions. Each individual key press constitutes a transaction. This illustrates how, a stimulus signalling protocol (also referred to as a stimulus response protocol) is a method of sending messages in a communications network whereby individual digits or other items of information are sent individually.

As discussed above an alternative to a stimulus signalling protocol is a message protocol. In a message protocol, a collection of related signalling information is sent as a discrete unit. For example, a called party number is sent as a single message together with additional call set-up information, clearing information or other additional information. An example of a message protocol system is the ITU-T H.323 multimedia conferencing standard.

Systems conforming to the H.323 standard allow audio and video telephony calls to be provided and also allow cross-platform application interworking which may be between similar computer architectures such as desktop computers, or completely different implementations such as dedicated video phone.

Figure 2:
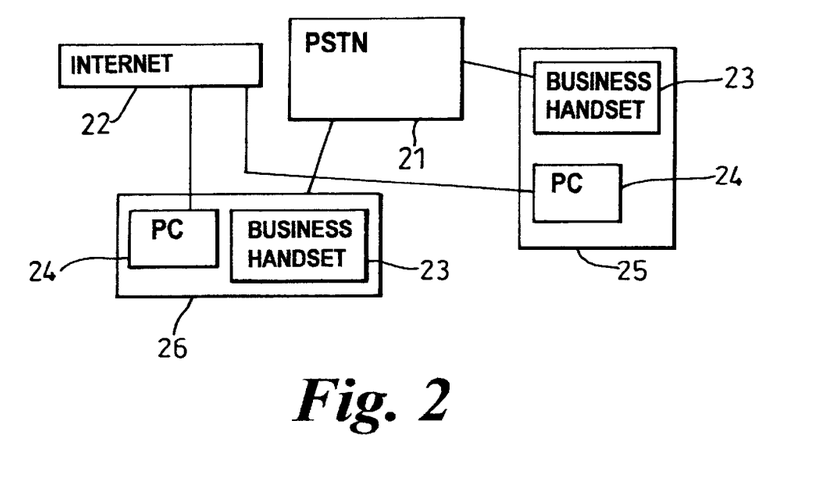
FIG. 2 is a general schematic diagram of a stimulus signalling protocol communications system and a message protocol communications network according to the prior art.

One problem is that systems and equipment that have been developed for use in stimulus signalling protocol communications systems are not compatible with message protocol systems. Two separate sets of equipment are required in order to make use of both systems. For example, FIG. 2 shows a stimulus signalling protocol communications system according to the prior art.

A user at location 26 has access to a business handset 23 and a computer 24 on his desk. The business handset is connected to a stimulus signalling protocol communications system, in this case a public switched telephone network (PSTN) 21. The computer 24 is connected to the Internet 22. A second user at location 25 also has a computer 24 and a business handset 23 which are connected similarly. The first user may use his computer 24 to send messages to the second user over the Internet 22 using a message protocol system but the stimulus signalling protocol business handset 23 cannot be used to send information over the Internet 22. Also, each user has two items on his desktop. This means that purchase and installation costs are increased and space is used.

For a stimulus signalling protocol such as the P-Phone signalling model, it is necessary that an "always up" connection is available between the terminal and an exchange or host. An "always up" connection is permanently active so that the terminal and exchange or host are always able to send and receive information over the connection at all times. This requirement is a result of the way that stimulus signalling protocol systems work. Stimulus signalling protocols were originally developed to facilitate the introduction of relatively "dumb" terminal units such as business handsets. These units needed to be simple because the overhead of both host and terminal message processing were significant factors in runtime efficiency of the overall switch. This was achieved in stimulus signalling protocols such as P-Phone by maintaining a state mapping of the terminal in the exchange. This enables host initiated state transitions to be reflected at the terminal so that all transfers whether from host to terminal or terminal to host are always initiated from the host. This allows central processor unit (CPU) occupancy and message throttling to be implemented centrally and for the runtime efficiency of the overall exchange (switch) to be improved. Central processor unit occupancy involves determining how busy the central processor unit is and message throttling is a method whereby some traffic is diverted in the event that the central processor unit is busy. However, an "always up" channel is required (i.e. a channel that is always open and available for use). For example, consider the situation when a voice mail message is left at the host and a message waiting indicator needs to be illuminated on the terminal. If an "always up" channel from the host to the terminal is not present then the message waiting lamp is not lit and the event is missed.

As already mentioned, the H.323 multimedia conferencing standard is an example of a message protocol system. The H.323 standard is an umbrella recommendation from the International Telecommunications Union (ITU). It sets standards for multimedia communication over packet based networks, including the Internet, which may not provide a guaranteed Quality of Service. H.323 entities may provide real-time audio, video and/or data communications. Support for audio communications is mandatory, while data and video services are optional. By complying with H.323 requirements the aim is that multimedia products and applications produced by different manufacturers can interwork and allow users to communicate without concern for compatibility. For example, H.323 establishes standards for compression and decompression of audio and video data streams, ensuring that equipment from different manufacturers can be used to receive and decompress the same information. The standard also establishes a common call set-up and control protocols.

H.323 defines four major components for a network based communications system: terminals, gateways, gatekeepers and multipoint control units (MCUs). Terminals are the user end-points on the communications network that provide realtime two way communications. All H.323 terminals must support voice communications; video and data are optional. H.323 specifies the modes of operation required for different audio, video, and/or data terminals to work together.

An H.323 gateway is an element that provides a connection or interface from the H.323 network to a non-H.323 communications network such as a public switched telephone network (PSTN). The H.323 gateway is able to translate between transmission formats and between communications procedures as well as being able to perform call set-up and clearing.

H.323 supports data conferencing using the ITU's T.120 standard. Data conferencing involves communication between two or more parties. T.120 addresses point-to-point and multipoint data conferences. An H.323 system can support data by incorporating T.120 capabilities into endpoints. Thus the specified standard for provision of end-to-end data channels within an H.323 connection is T.120. The T.120 specification provides for both defined data channel types such as Whiteboarding and text chat and ad-hoc channel content to allow proprietary application support.

It is an object of the present invention to provide an apparatus and method for integrating stimulus signalling protocol communication systems with message protocol communication systems which overcomes or at least mitigates one or more of the problems noted above.

SUMMARY OF THE INVENTION

According to a first aspect of the present invention there is provided a method of sending information between a message protocol compatible terminal in a message protocol communications network and a gateway to a stimulus signalling protocol communications network, comprising the steps of:
(i) establishing a first, deactivated two-way communications channel between the terminal and the gateway;
(ii) opening a second two-way communications channel between the gateway and the terminal, said second two-way communications channel being associated with said first, deactivated, two-way communications channel;
(iii) sending stimulus signalling protocol information over said second, two-way communications channel;
(iv) detecting when information is about to be sent via said first, deactivated, two-way communications channel, on the basis of information sent over the second two-way communications channel and, if information is about to be sent via said first, deactivated, two-way communications channel, activating said first two-way communications channel; and
(v) sending information over said activated first two-way communications channel.

A corresponding communications network is provided comprising a message protocol communications network connected via a gateway to a stimulus signalling protocol communications network, said gateway comprising:
(i) a processor arranged to establish a first, deactivated two-way communications channel between a message protocol compatible terminal in said message protocol communications network and said gateway;
(ii) a second processor arranged to open a second two-way communications channel between the gateway and the terminal, said second two-way communications channel being associated with said first, deactivated, two-way communications channel;
(iii) a transmitter arranged to send stimulus signalling protocol information over said second two-way communications channel;
(iv) a detector arranged to detect when information is about to be sent via said first, deactivated, two-way communications channel, on the basis of information sent over said second two-way communications channel;
(v) an activator arranged to activate said first deactivated two-way communications channel if information is about to be sent via said first deactivated two-way communications channel; and
(vi) a second transmitter arranged to send information over said activated first two-way communications channel.

A corresponding gateway is provided said gateway being adapted to provide an interface between a message protocol communications network and a stimulus signalling protocol communications network, comprising:
(i) a processor arranged to establish a first, deactivated two-way communications channel between said gateway and a message protocol compatible terminal in the message protocol communications network;
(ii) a second processor arranged to open a second two-way communications channel between said gateway and said terminal, said second two-way communications channel being associated with said first, deactivated, two-way communications channel;
(iii) a transmitter arranged to send stimulus signalling protocol information over said second, two-way communications channel;
(iv) a detector arranged to detect when information is about to be sent via said first, deactivated, two-way communications channel, on the basis of information sent over the second two-way communications channel;
(v) an activator arranged to activate said first, deactivated, two-way communications channel if information is about to be sent via said first, deactivated, two-way communications channel; and
(v) a second transmitter arranged to send information over said first, activated two-way communications channel.

A corresponding program stored on a computer readable medium is provided, said program being intended for use on a gateway between a message protocol communications network and a stimulus signalling protocol communications network, such that said gateway is able to:
(i) establish a first, deactivated, two-way communications channel between a message protocol compatible terminal in said message protocol communications network and said gateway;
(ii) open a second two-way communications channel between the gateway and the terminal, said second two-way communications channel being associated with said first, deactivated, two-way communications channel;

(iii) send stimulus signalling protocol information over said second, two-way communications channel;

(iv) detect when information is about to be sent via said first, deactivated, two-way communications channel, on the basis of information sent over said second, two-way communications channel;

(v) activate said first, deactivated, two-way communications channel if information is about to be sent via said first, deactivated, two-way communications channel; and (vi) send information over said first, activated, two-way communications channel.

This provides the advantage that stimulus signalling protocol information can be sent over a message protocol communications network and it is not necessary to carry out protocol conversion in order to do this. For example, a business handset in a P-Phone system can be used to send stimulus signalling information via a gateway into a message protocol communications network such as the Internet. In this way voice information from a P-Phone business handset is sent over the Internet and is accessed by a terminal that is message protocol compatible. A stimulus signalling protocol is associated with a message protocol and also discrete stimulus transactions such as P-Phone functions are encapsulated within a uniform message stream.

Preferably information about said stimulus signalling protocol is provided t said terminal. This enables the terminal to be both message protocol and stimulus signalling protocol compatible. For example, an emulation of a business handset can be created on the terminal (for example a PC) and this enables the user to make calls from the emulated business handset over the Internet or other message protocol network. The user does not require a PC and a business handset and this saves costs, space, and maintenance. Calls can be made to and from the emulated business handsets over message protocol networks such as data communications networks.

Further benefits and advantages of the invention will become apparent from a consideration of the following detailed description given with reference to the accompanying drawings, which specify and show preferred embodiments of the invention.

DETAILED DESCRIPTION OF THE INVENTION

Embodiments of the present invention are described below by way of example only.

These examples represent the best ways of putting the invention into practice that are currently known to the Applicant although they are not the only ways in which this could be achieved.

The term "two-way communication channel" is used to refer to a communications channel that allows bidirectional communication; it may comprise two unidirectional communications channels.

Figure 4:
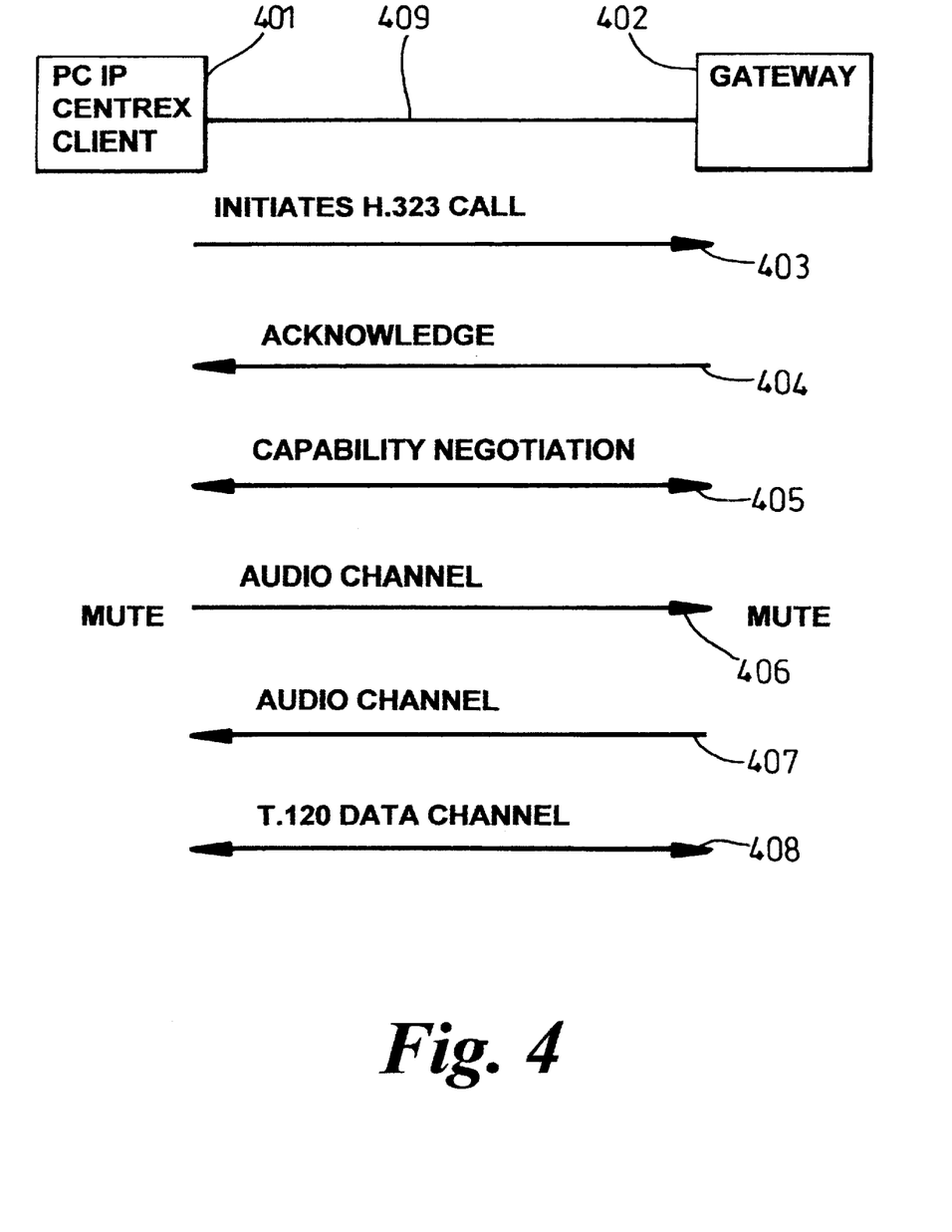
FIG. 4 is a flow diagram of a method for sending information between the gateway of FIG. 3 and a message protocol compatible terminal.

FIG. 4 is a flow diagram showing how a call is made from an IP Centrex Client 401 to a gateway 402 over a data communications network 409. The gateway provides an interface between the data communications network 409 and a stimulus signalling protocol communications network (not shown) such as a public switched telephone network. The IP Centrex Client 401 is an example of a terminal that is message protocol compatible and which is also able to send and receive stimulus signalling protocol information. In this example, the IP Centrex client 401 is a personal computer which contains software that emulates a business handset. The personal computer provides a user interface display like the one shown in FIG. 7 which has representations of a key pad 72, indicator lights 74, feature or function buttons 73 and a display screen 71. Information is displayed on this interface in the same way as it would be for a business handset and the user is able to enter information using the interface.

When the user initiates an IP Centrex client on the personal computer 401 the IP Centrex client 401 initiates an H.323 call over the H.323 data communications network 403. The Gateway 403 receives the call initiation request and acknowledges this 404. A capability negotiation process 405 then takes place between the IP Centrex Client 401 and the Gateway 402 and once this is completed a call path is set up for the call. This comprises a bidirectional or two-way H.323 audio channel 406, 407 between the PC 401 and the Gateway 402 that is mute or deactivated. The next stage involves setting up a T.120 data channel 408 that is associated with the bidirectional audio channel. The term, "associated" is used here to refer to the fact that the T.120 data channel and the audio channel are part of the same H.323 call. Once the T.120 channel is set up, stimulus signalling information is transferred from the IP Centrex client 401 to the gateway 402. For example, any key presses that the user makes on the interface (such as the one shown in FIG. 7) are sent over the T.120 channel. Information from the T.120 channel is used to detect when the user is about to start the voice message. For example, this can be done using a processor in the gateway which uses information from the T.120 channel to detect when a voice message is about to start. At this point the audio channel 406, 407 is activated allowing voice conversation to take place. The communications network 409 which acts as a carrier network is therefore oblivious to the nature of the signalling within the T.120 channel and this means that the carrier data network 409 can be generic.

The T.120 channel thus implements a private channel for "always up" signalling as is required for P-Phone signalling. The T.120 channel is opened between the Centrex-enabled H.323 client 401 and the H.323 compliant PSTN gateway whenever the PC application 401 is active. This allows the T.120 logical data channel to replicate the functionality of a conventional local-loop. It is possible to make the T.120 data channel permanently active for P-Phone messaging because very little bandwidth is required when the terminal is idle. For example, P-Phone signalling on a prior art local loop is performed at 300 bps whereas a voice path requires 64 Kbps in each direction. Because P-Phone is not a defined T.120 data channel content type, a pre-defined globally unique identifier is used.

The audio stream required for the two-way voice call is both network bandwidth and processor intensive because of the higher data rates and because associated software codec technology is typically employed in commercial H.323 client implementations. This means that it is not possible to provide an always up audio channel because the network would quickly become saturated. This problem is addressed by activating the audio channel only when a voice transmission is about to take place as described above. The T.120 channel is opened in advance of the audio channel and then the audio channel is activated and deactivated as required. The H.323 and T.120 standards, although closely related, are capable of standalone implementation. This permits the establishment of a T.120 channel mediated between H.323 capable devices, where the data channel is opened in advance of an actual H.323 multimedia connection such as a voice stream. Also, the P-Phone control protocol includes sufficient supervision messaging to allow detection of when a voice path is active between the host (e.g. gateway) and terminal. This makes it viable to establish the H.323 audio channel only when actual voice transmission is required with the terminal. P-Phone based units do not use in-band signalling, for example dual tone modulation frequency (DTMF), on the local loop and so there is no impact on features such as indirect access, where authentication code information is provided in-band prior to voice channel establishment.

Additional channels for media types such as private data signalling and other H.323 derived streams such as real-time video can easily be accommodated within the call establishment architecture.

The "always up" channel that is set up for the stimulus signalling information does not have to be a T.120 data channel. Other types of data channel could be used. Similarly, the audio channel does not have to be an H.323 channel. Any type of channel that is suitable for communicating voice information can be used.

Figure 3:
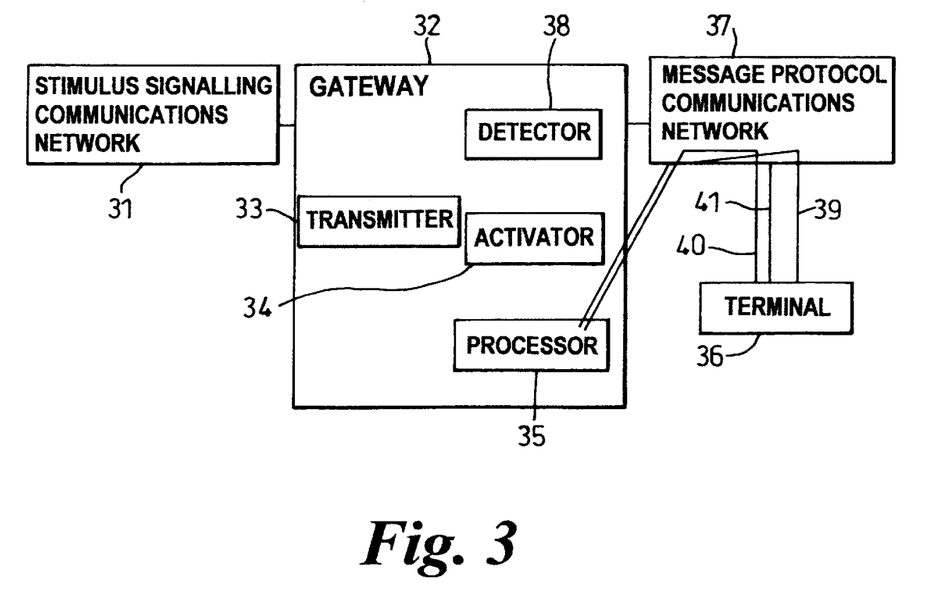
FIG. 3 is a general schematic diagram of a gateway between a stimulus signalling protocol communications network and a message protocol communications network.

FIG. 3 shows a gateway 32 that is adapted to provide an interface between a message protocol communications network 37 and a stimulus signalling protocol communications network 31. The gateway 32 comprises a processor 35 arranged to establish a first, deactivated, two-way communications channel 39 between the gateway 32 and a message protocol compatible terminal 36 in the message protocol communications network 37. The processor 35 is also arranged to open a second two-way communications channel 40 between the gateway 32 and terminal 36, said second channel 40 being associated with said first two-way communications channel 39. A transmitter 33 is arranged to send stimulus signalling protocol information over said second channel 40 and a detector 38 is arranged to detect when information is about to be sent via said first communications channel 39, on the basis of information sent over the second channel 40. An activator 34 is arranged to activate said first two-way communications channel 39 if information is about to be sent via said first two-way communications channel 39. There is also a second transmitter 33 arranged to send information over said first communications channel 39 once it is activated. The term "activated" is used to refer to a communications channel that is initiated so that it is immediately able to communicate information. An activated channel takes up bandwidth and possibly also processor capacity whereas a deactivated channel does not. In this example, the detector 38, activator 34, and processor 35 are provided within the gateway 32. However, this is not essential; these functions can be provided by separate apparatus.

Figure 5:
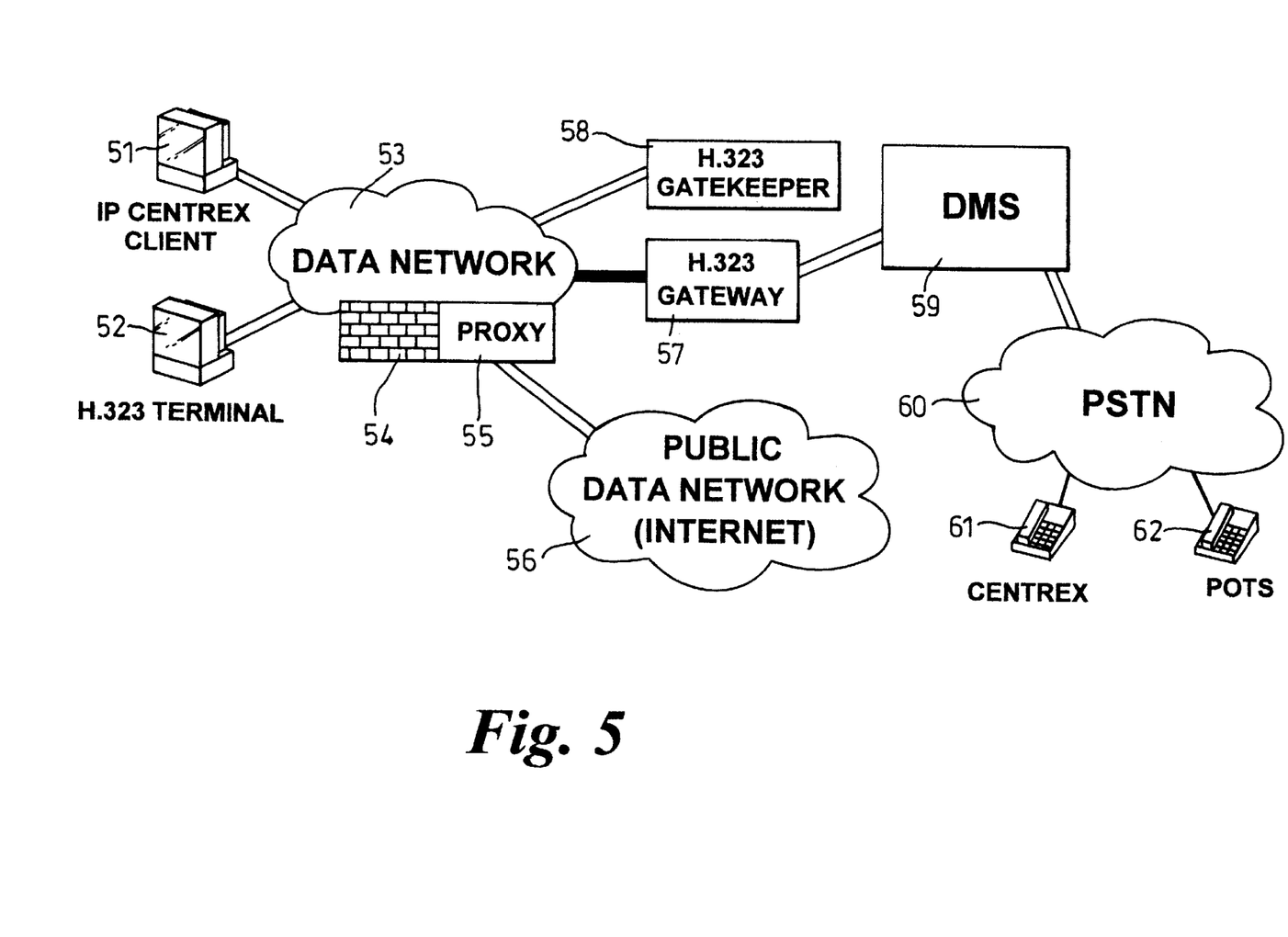
FIG. 5 is a schematic diagram of a data network connected to a public switched telephone network via a H.323 gateway.

FIG. 5 is a schematic diagram of a data network 53 connected to a public switched telephone network 60 via an H.323 gateway 57. The data network 53 is an example of a message protocol communications network connected to which are an IP Centrex client 51, an H.323 terminal 52, an H.323 gatekeeper 58 and a public data network 56. The IP Centrex client is an example of a terminal that is message protocol compatible and which is also able to send and receive stimulus signalling information. In this example the public data network 56 is the Internet and this is connected to the data network via a firewall 54 and proxy 55. The data network 53 can be a company local area network for example.

The gateway 57 provides an interface between the data network 53 and an entry point 59 to the public switched telephone network 60. A business handset 61 that is stimulus signalling protocol compatible is provided on the PSTN 60 together with a conventional telephone handset 62. Communication can be established between the IP Centrex client 51 and the Centrex terminal 61 via the gateway 57. This involves sending stimulus signalling information over the data network 53. In order to do this an H.323 channel is set up over the data network 53 together with an associated "always up" T.120 data channel as described above. This means that the user of the IP Centrex client 51 which may be for example a PC is able to communicate with other terminals on the PSTN. The user of the client 51 gains all the functionality of a business handset without the need to install a business handset itself or to connect this business handset directly to the PSTN. Similarly the user of the terminal 61, 62 is able to communicate with stimulus signalling enabled terminals 51 within a data network.

Figure 6:
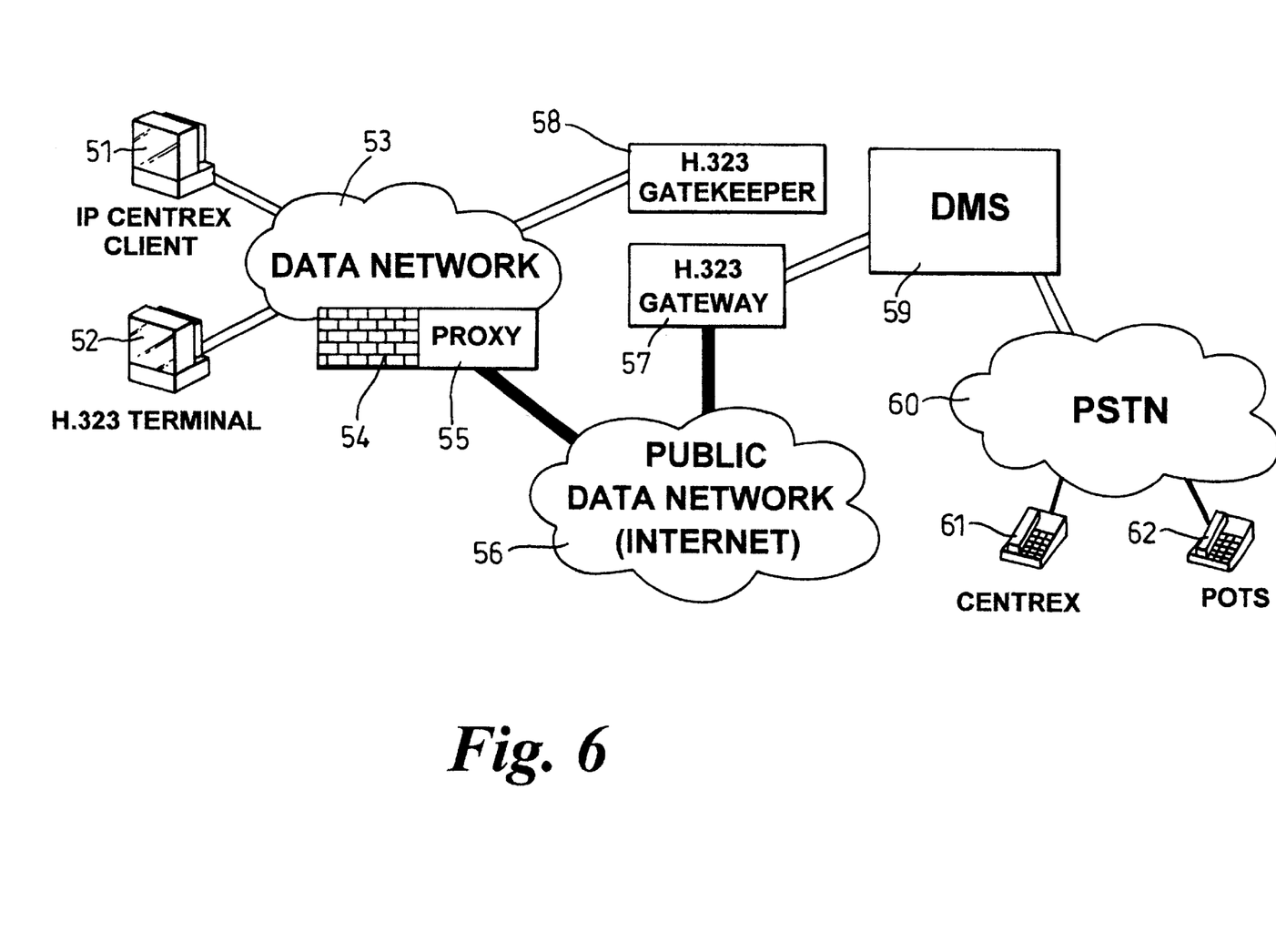
FIG. 6 is the same as FIG. 5 but the H.323 gateway is connected to the data network via the Internet.

FIG. 6 is the same as FIG. 5 but the H.323 gateway is connected to the data network via the Internet. In this case communications can be established over the Internet. For example a user of business handset 61 can hold a two-way voice communication with a user of stimulus signalling enabled terminal 51.

Firewalls are typically used to control which specific IP ports may be opened between devices on two networks such as a local area network 53 and the Internet 56. It is common to allow specific port connections to be established which originate from Intranet devices and terminate on an Internet devices, whereas the equivalent external to internal connection is denied even though the same port is used. However, in the H.323 system network firewalling based on port allocation can be ineffective. The H.323 call model is implemented such that initial channel allocation is mediated through well-known port numbers on each device. Once the call control has been established, it is inherent in the protocol that additional non well-known ports are utilised when additional media streams are established between devices. Because H.323 applications do not use statically defined ports, network firewalling based on port allocation can be ineffective. If transfer through non well known ports is disabled then indeterminate behaviour may result where valid connections are prevented from being established. Conversely, enabling non well known port connections may allow unwanted connections to be established. In order to prevent this firewalls which can permit and deny connections across their boundary based on the nature of usage of a connection rather than specific port allocations are used. H.323 enabled firewalls can be used which supervise ad-hoc channels between internal and external devices across a firewall based on the logical channel identifier rather than the port number. Only those ports which correspond to virtual channels which were opened as a result of valid H.323 messaging are permitted to propagate between networks. This allows the propagation of a T.120 private signalling channel containing P-Phone messaging between network boundaries regardless of the actual network ports which are in use.

An advantage of using the T.120 and H.323 protocols is that provide defined authentication mechanisms. This avoids the requirement to define and implement any additional authentication schemes. These would be required in order to ensure the necessary access controls are in place to allow only authorised terminals to register with the gateway.

As an alternative to using a T.120 channel for the P-Phone signalling a raw socket based signalling scheme can be implemented between the gateway and terminal. However, this is disadvantageous because it is not possible to make use of the authentication mechanisms within the H.323 protocols. Also, if use of a firewall is required then the firewall must be configured to allow the required connection for each terminal which opens a port for signalling.

Figure 8:
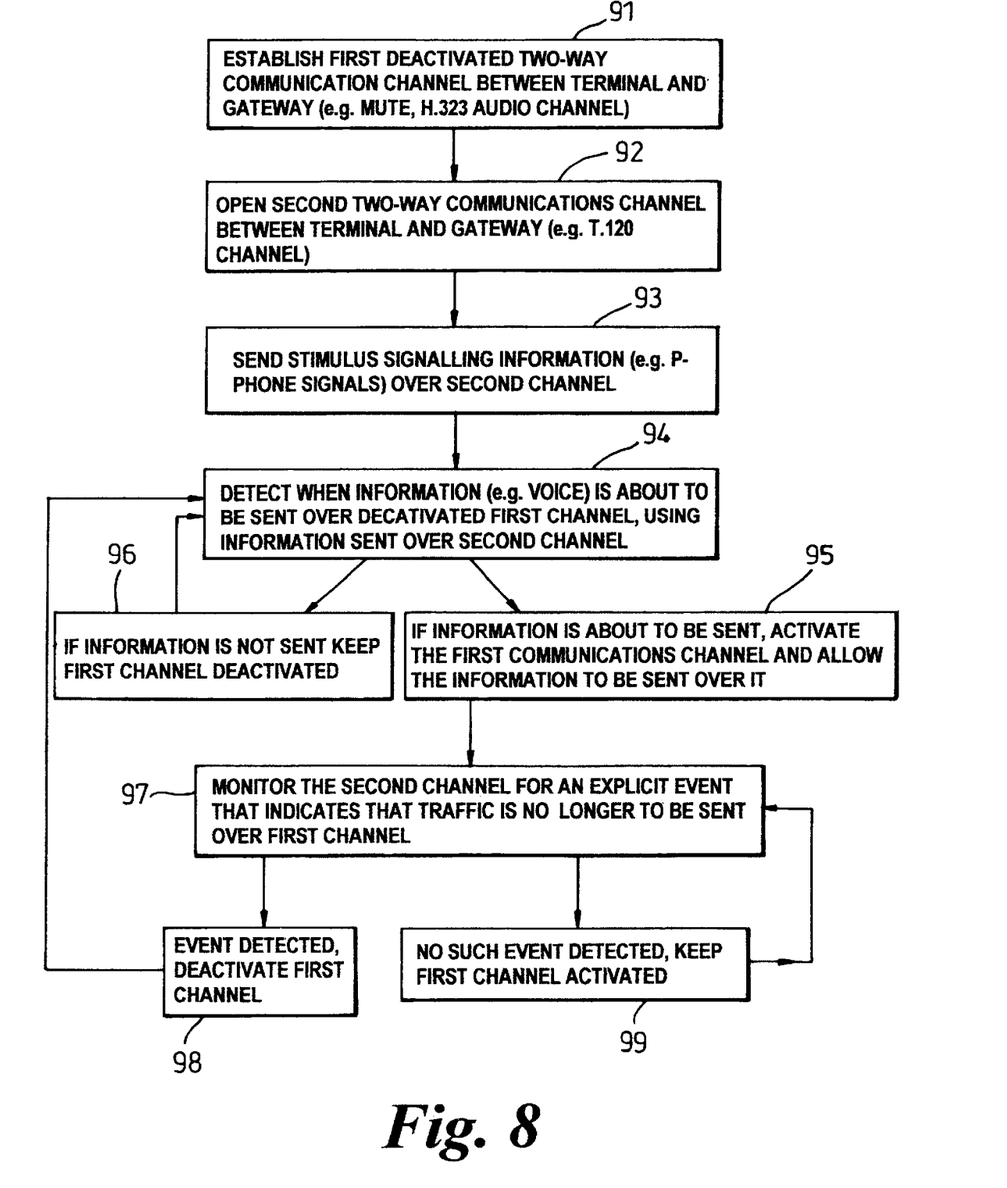
FIG. 8 is a flow diagram indicating steps carried out by a program.

FIG. 8 is a flow diagram indicating a program that is stored on a computer readable medium. The program is intended for use on a gateway 32 between a message protocol communications network 37 and a stimulus signalling protocol communications network 31, such that said gateway 32 is able to carry out the steps described below.

The first step involves establishing a first, deactivated, two-way communications channel between a message protocol compatible terminal 36 in said message protocol communications network 37 and said gateway 32. This step is indicated in box 91 of FIG. 8. This step involves the gateway 402 receiving a signal from the terminal 36 which indicates that a call is requested. The software is arranged to detect this and respond by causing an acknowledgement message to be sent from the gateway 32 to the terminal 36. A series of messages are then sent between the gateway 32 and the terminal 36 during a capability negotiation process whereby the capabilities of each of the end-points are determined before proceeding. This capability negotiation process is controlled by the software. An example of this stage is setting up an H.323 call as is known to the skilled person in the art.

The next stage involves opening a second two-way communications channel 408 between the gateway 402 and the terminal 401. This stage is illustrated in box 92 of FIG. 8. This second two-way communications channel 408 is associated with said first communications channel 406, 407 in that these channels are part of the same call. The software controls this process.

Figure 7:
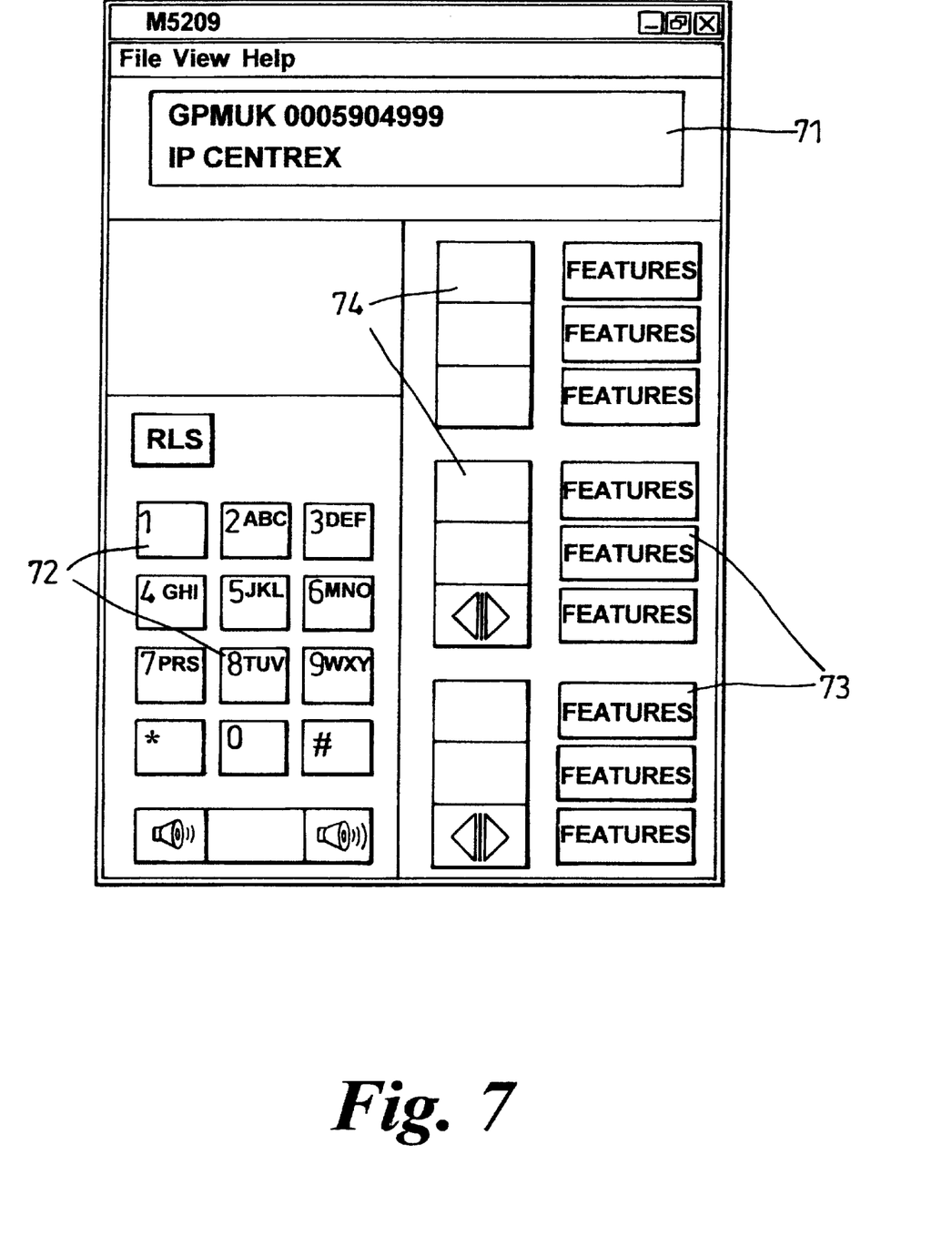
FIG. 7 is an example of a screen display showing an emulated business handset.

The software then allows stimulus signalling protocol information such as P-Phone signals to be sent over said second two-way communications channel 408 as illustrated in box 93 of FIG. 8. The software has access to data sent over the second two-way communications channel 408 and uses this to detect or determine when information is about to be sent via the first two-way communications channel. If this is the case, then the first two-way communications channel is activated and information is sent over this activated channel. This is indicated in boxes 94 and 95 of FIG. 8. The second channel is then monitored for a specific event which indicates that the first channel can be deactivated (see box 97 of FIG. 8). When this event is detected the first channel is deactivated. If no information is being sent over the first channel this is detected by the software and the first channel is deactivated again (box 98). This saves on bandwidth and processor capacity as explained above. The software also has access to information about the stimulus signalling protocol which enables the software to interpret stimulus signalling information sent over the second channel. For example, this information can be stored in the terminal 401 itself or can be stored in the gateway 402. Software for providing an interface on the terminal 401 is also provided and this makes use of the information about the stimulus signalling protocol. This software provides a display, for example as shown in FIG. 7. Stimulus signalling information such as P-Phone signals are interpreted by the software and the appropriate actions initiated. For example, if a voice mail message has been left, a P-Phone signal is sent to the terminal in order to light a voice mail lamp on the user interface display. The software interprets this signal and causes the display to be updated appropriately. Similarly, when the user provides inputs to the interface, such as pressing a button to retrieve voice mail messages, this action is converted into the appropriate P-Phone signal by the interface and this is then sent over the two-way T.120 channel.

A range of applications are within the scope of the invention. These include situations in which it is required to integrate stimulus signalling protocol communication systems with messaging protocol communications systems. For example, in order to use P-Phone compatible equipment in conjunction with data networks such as H.323 compliant networks. The invention also encompasses a gateway that is arranged to allow stimulus signalling information to be sent over a message protocol communications network and software for controlling such a gateway. Software for adapting a message protocol compatible terminal so that it can interpret stimulus signalling protocol information is also within the scope of the invention.

What is claimed is:

1. A method of sending information between a message protocol compatible terminal in a message protocol communications network and a gateway to a stimulus signalling protocol communications network, comprising the steps of:
    (i) establishing a first deactivated, two-way, communications channel between said terminal and said gateway;
    (ii) opening a second two-way communications channel between said gateway and said terminal, said second two-way communications channel being associated with said first deactivated, two-way communications channel;
    (iii) sending stimulus signalling protocol information over said second two-way communications channel;
    (iv) detecting when information is about to be sent via said first, deactivated, two-way communications channel, on the basis of said stimulus signalling protocol information sent over the second, two-way communications channel and, if information is about to be sent via said first, deactivated, two-way communications channel, activating said first two-way communications channel; and
    (v) sending information over said first, activated two-way communications channel.

2. A method as claimed in claim 1 wherein said information sent over said first, activated two-way communications channel is voice information.

3. A method as claimed in claim 1 wherein said terminal is a personal computer comprising an emulated business handset.

4. A method as claimed in claim 1 wherein said first two-way communications channel is an audio channel.

5. A method as claimed in claim 1 wherein said first two-way communications channel is an H.323 channel.

6. A method as claimed in claim 1 wherein said second two-way communications channel is a data channel.

7. A method as claimed in claim 4 wherein said second two-way communications channel is a T.120 channel.

8. A method as claimed in claim 1 which further comprises the step of deactivating said first two-way communications channel if information is not being sent over said first two-way communications channel.

9. A method as claimed in claim 1 which further comprises the step of providing information about a stimulus signalling protocol of said stimulus signalling protocol communications network to said terminal.

10. A method as claimed in claim 1 wherein said step (i) of establishing a first, deactivated, two-way communications channel between the terminal and the gateway comprises providing a signal to said gateway to indicate that a channel is requested and providing an authentication of said request by the gateway.

11. A gateway adapted to provide an interface between a message protocol communications network and a stimulus signalling protocol communications network, comprising:

(i) a processor arranged to establish a first, deactivated, two-way communications channel between the gateway and a message protocol compatible terminal in the message protocol communications network;

(ii) a second processor arranged to open a second two-way communications channel between the gateway and the terminal, said second two-way communications channel being associated with said first, deactivated, two-way communications channel;

(iii) a transmitter arranged to send stimulus signalling protocol information over said second two-way communications channel;

(iv) a detector arranged to detect when information is about to be sent via said first, deactivated, two-way communications channel, on the basis of said stimulus signalling protocol information sent over said second two-way communications channel;

(v) an activator arranged to activate said first two-way communications channel if information is about to be sent via said first, deactivated, two-way communications channel; and (vi) a second transmitter arranged to send information over said first, activated two-way communications channel.

12. A gateway as claimed in claim 11 wherein said first two-way communications channel is an audio channel.

13. A gateway as claimed in claim 11 wherein said second two-way communications channel is a data channel.

14. A gateway as claimed in claim 13 wherein said second two-way communications channel is a T.120 channel.

15. A communications network comprising a message protocol communications network connected via a gateway to a stimulus signalling protocol communications network, said gateway comprising:

(i) a processor arranged to establish a first, deactivated, two-way communications channel between a message protocol compatible terminal in said message protocol communications network and said gateway;

(ii) a second processor arranged to open a second two-way communications channel between the gateway and the terminal, said second two-way communications channel being associated with said first, deactivated, two-way communications channel;

(iii) a transmitter arranged to send stimulus signalling protocol information over said second, two-way communications channel;

(iv) a detector arranged to detect when information is about to be sent via said first, deactivated, two-way communications channel, on the basis of information sent over the second two-way communications channel;

(v) an activator arranged to activate said first two-way communications channel if information is about to be sent via said first, deactivated, two-way communications channel; and (vi) a second transmitter arranged to send information over said first, activated two-way communications channel.

16. A communications network as claimed in claim 15 wherein said first two-way communications channel is an audio channel.

17. A communications network as claimed in claim 15 wherein said first two-way communications channel is an H.323 channel.

18. A communications network as claimed in claim 15 wherein said second two-way communications channel is a data channel.

19. A communications network as claimed in claim 18 wherein said second two-way communications channel is a T.120 channel.

20. A program stored on a computer readable medium said program being intended for use on a gateway between a message protocol communications network and a stimulus signalling protocol communications network, such that said program causes said gateway to carry out the method steps of:

(i) establishing a first deactivated, two-way communications channel between a message protocol compatible terminal in said message protocol communications network and said gateway;

(ii) opening a second two-way communications channel between the gateway and the terminal, said second two-way communications channel being associated with said first, deactivated, two-way communications channel;

(iii) sending stimulus signalling protocol information over said second two-way communications channel;

(iv) detecting when information is about to be sent via said first, deactivated, two-way communications channel, on the basis of information sent over the second two-way communications channel;

(v) activating said first two-way communications channel if information is about to be sent via said first, deactivated, two-way communications channel; and (vi) sending information over said first, activated, two-way communications channel.

21. A program as claimed in claim 20 which further provides the ability to interpret stimulus signalling protocol information received by said terminal.

22. A program as claimed in claim 20 which further provides a user interface via said terminal.

* * * * *